INVENTORS:
VINCENT JANIS JR.
GUL P. BHATIA
BY: Numan Gerlach

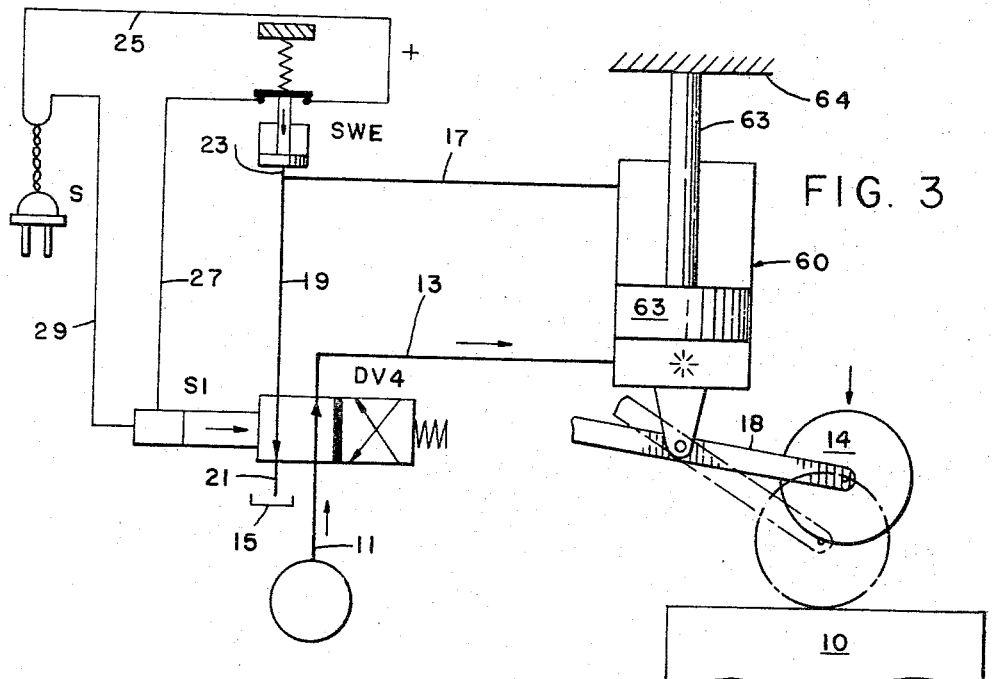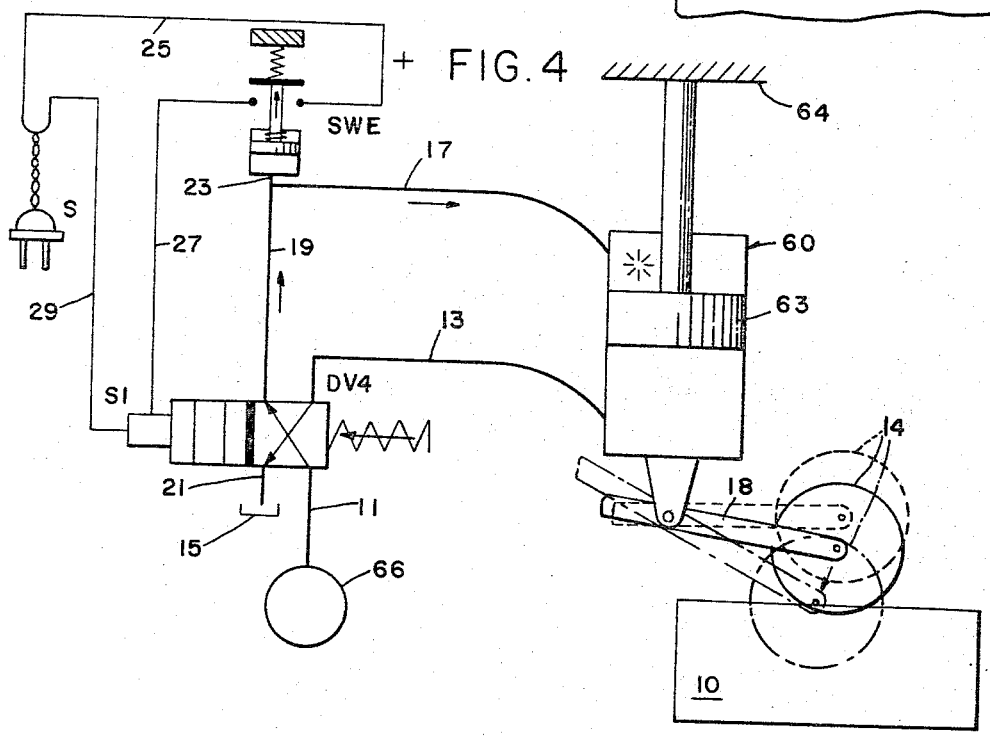

INVENTORS:
VINCENT JANIS JR.
GUL P. BHATIA
BY: Norman Heeler

United States Patent Office 3,330,072
Patented July 11, 1967

3,330,072
GRINDING MACHINE WITH AUTOMATIC SAFETY DROP-OFF CONTROL CIRCUIT THEREFOR
Vincent Janis, Jr., and Gul P. Bhatia, Park Ridge, Ill., assignors to Pettibone Mulliken Corporation, Chicago, Ill., a corporation of Delaware
Filed June 2, 1964, Ser. No. 372,033
1 Claim. (Cl. 51—35)

The present invention relates generally to grinding machines of the type which is commonly employed for conditioning the surfaces of steel billets and other workpieces to remove scale and imperfections therefrom. The invention is particularly concerned with grinding machines that employ for their surface-conditioning effect relatively massive grinding wheels which operate at high speed and are caused to traverse, or be repeatedly transversed by, the billets or other workpieces undergoing conditioning and in which constant downward pressure of the grinding wheels is maintained during such traversing operations, either by gravity alone, by hydraulic pressure, or by a combination of these two forces.

In any grinding machine employing a relatively massive high-speed grinding wheel, possible drop-off of the grinding wheel over the edge of a particular billet or other piece of work at the end of a given traverse operation presents an extremely hazardous condition. Even an experienced operator occasionally will overrun an end of a billet or other workpiece. When this occurs, the operator sometimes becomes confused and inadvertently actuates a control which brings the rotating grinding wheel into contact with the adjacent end face of the billet, thus resulting in shattering of the brittle or frangible wheel. If the drop-off occurs at a low traverse speed or just as the operator effects a reversal of traverse, the rotating wheel will not completely clear the adjacent edge of the billet and jamming of the machine and shattering of the wheel with explosive force usually results.

The present invention, in one form thereof, provides in connection with a grinding machine of the type under consideration a safety circuit which is largely of an hydraulic nature and by means of which the danger ordinarily attendant upon grinding wheel drop-off is eliminated. Accordingly, means are provided whereby internal pressure in the hydraulic system by means of which grinding pressure is applied to the grinding wheel is sensed and, when a sudden increase in such pressure resulting from a dynamic overload in the system obtains by reason of the drop-off, a fluid reversal in the system is effected automatically so that fluid down-pressure on the grinding wheel is relieved and fluid up-pressure is applied to the wheel, thus immediately elevating the grinding wheel before its weight becomes effective to carry it appreciably below the plane of the billet or workpiece surface undergoing grinding. This form of the invention is, of course, applicable only to a grinding machine which employs hydraulic pressure for maintaining the grinding wheel in contact with the surface undergoing conditioning, either aloe or in combination with the effect of gravity.

In a modified form of safety control system which is applicable to all grinding machines, whether the down-pressure of the grinding wheel be maintained by hydraulic means, by the force of gravity, or by a combination of these two forces, instead of sensing the increase in pressure in the hydraulic system which takes place when the grinding wheel overruns the edge of the billet or other workpiece, the decreased amperage in the electric circuit which energizes the grinding wheel driving motor is sensed and appropriate relay mechanism is actuated to effect fluid reversal in the hydraulic circuit as heretofore outlined in connection with the alternative form of safety circuit. Obviously, when a grinding wheel ceases to make frictional contact with the surface undergoing grinding, as is the case when the wheel overruns the edge of the work, the flow of current in the grinding wheel motor circuit is restored to idling current and the modified safety circuit of the present invention is based upon this principle.

It is, therefore, the principal object of the present invention to provide a grinding machine which embodies a safety circuit of either of the two aforementioned forms or types.

Other objects of the invention and the various advantages and characteristics of the present grinding machine will be apparent from a description of the following detailed description.

The invention consists in the several novel features which are hereinafter set forth and are more particularly defined by the claim at the conclusion hereof.

In the accompanying four sheets of drawings forming a part of this specification, the two forms of safety circuits briefly outlined above have been illustrated in detail.

FIG. 1A is an enlarged fragmentary perspective view of a limited portion of the grinding machine of FIG. 1, the purpose of such view being to illustrate additional electrical and hydraulic components that are omitted from FIG. 1 in the interests of clarity;

FIG. 3 is a combined hydraulic and electric circuit diagram illustrating the manner in which hydraulic pressure in the grinding wheel down-pressure system is sensed for the purpose of preventing grinding wheel drop-off, the parts and components being shown in their normal positions when the griding wheel is supported upon the work;

Figure 5:
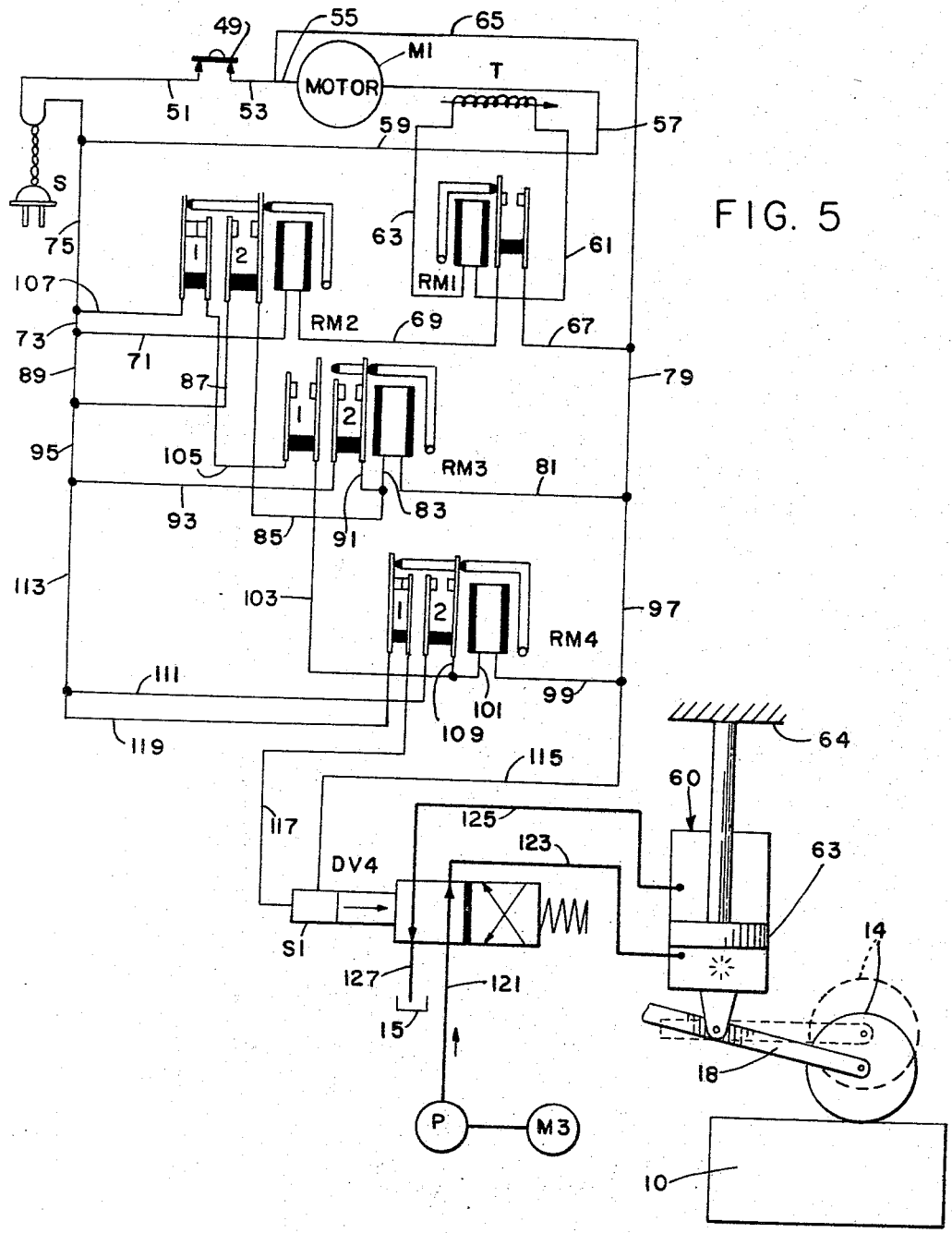

FIG. 4 is a circuit diagram similar to FIG. 3 but showing the parts in the positions which they assume when the grinding wheel overruns an end edge of the work; and FIG. 5 is a circuit diagram similar to FIG. 3 but illustrating the aforementioned aforementioned alternative form of safety circuit wherein a change in the flow of current in the electric circuit for the motor which drives the grinding wheel is sensed to detect a potential grinding wheel drop-off and whereby remedial measures are instituted to prevent the drop-off.

Figure 1:
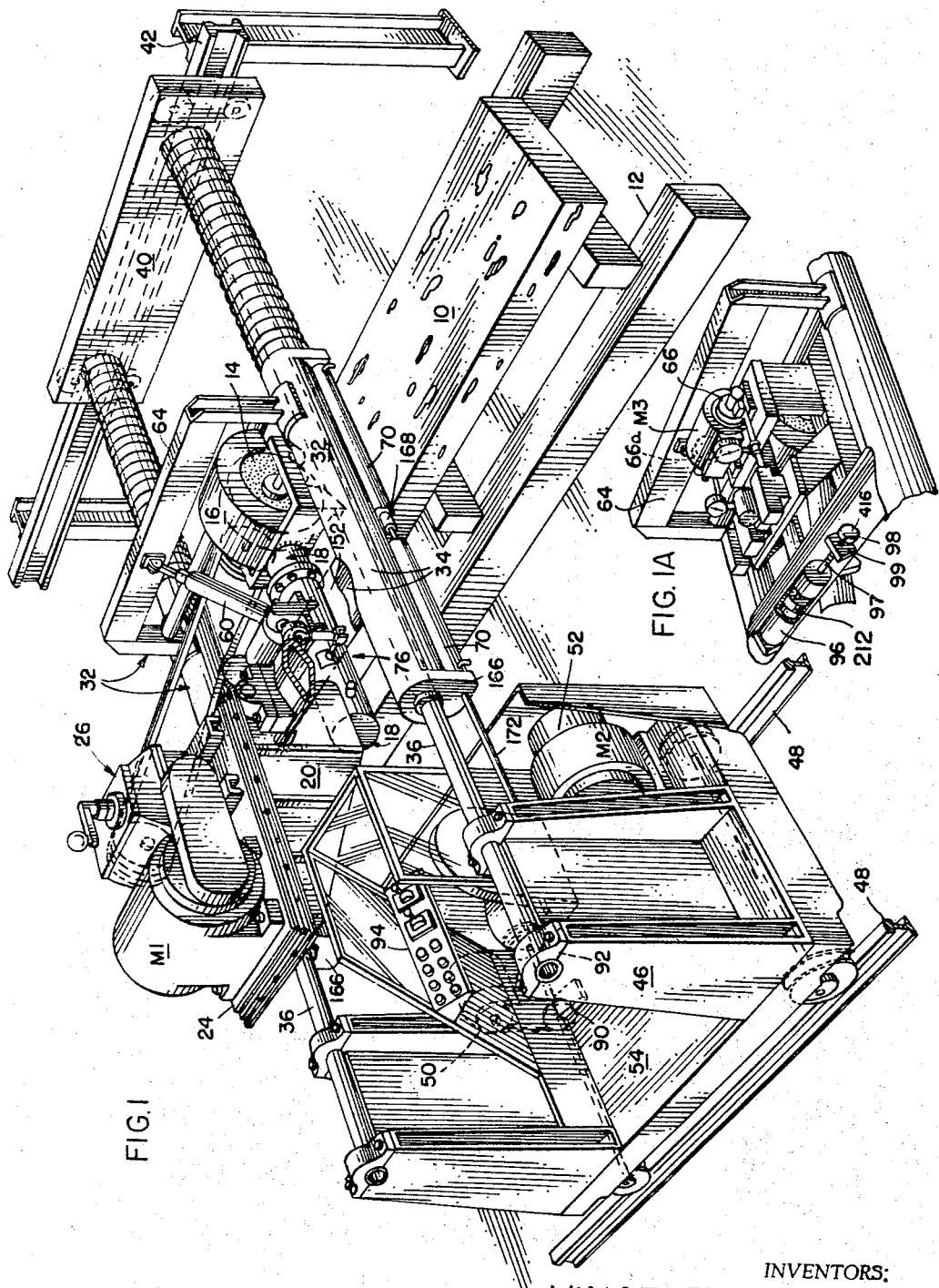
FIG. 1 is a front perspective view of a grinding machine of the type that is capable of having embodied therein either of the alternative forms of safety circuits of the present invention, such view showing certain of the hydraulic and electrical components which form a basis for such circuits.
Figure 2:
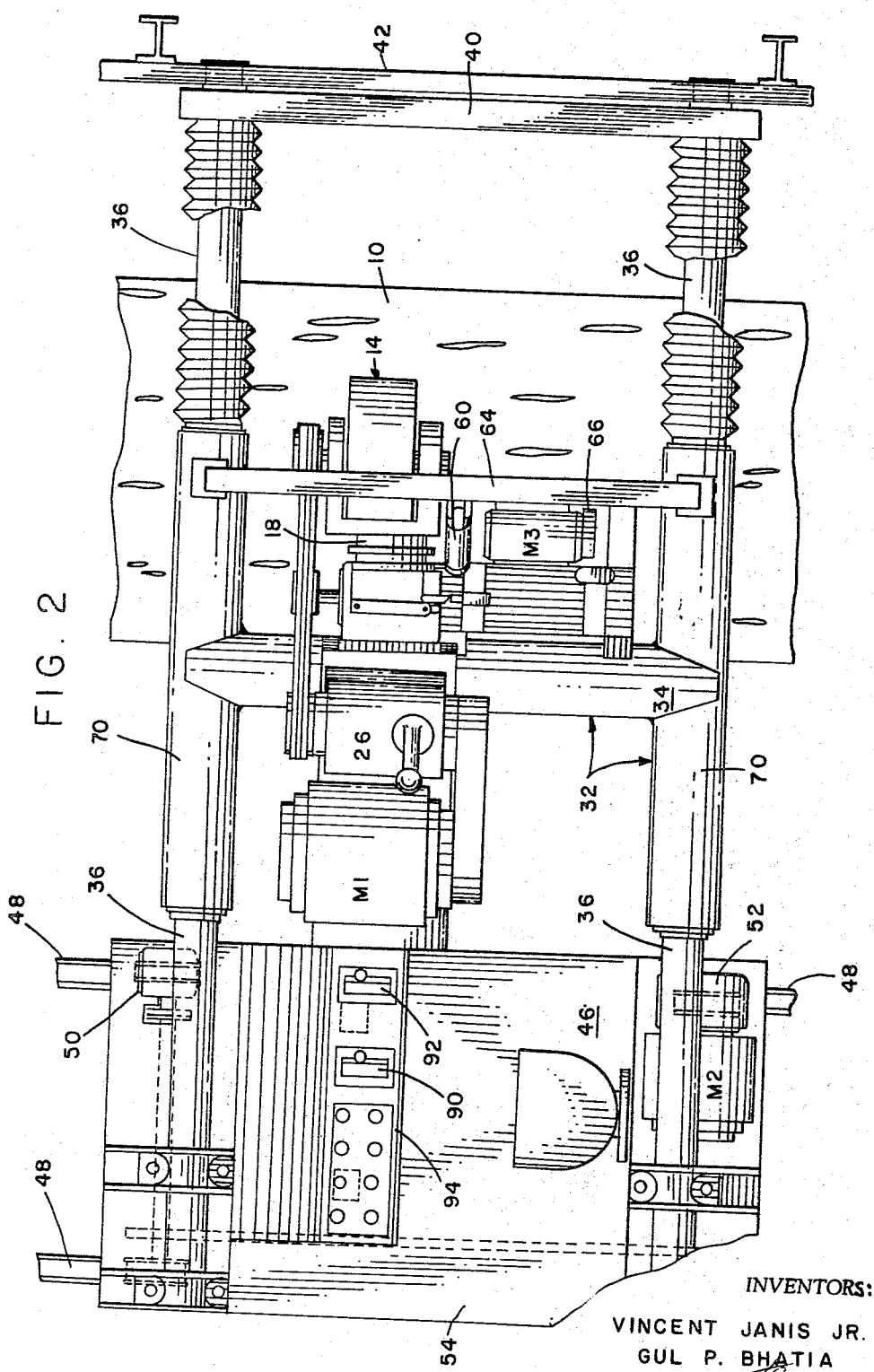
FIG. 2 is a top plan view of the grinding machine.

Referring now to the drawings in detail and in particular to FIG. 1 wherein an exemplary form of grinding machine that is capable of embodying either of the two alternative forms of safety circuits of the present invention is shown, such machine is of the same general type that is shown and described in United States Patent No. 3,253,368, granted on May 31, 1966 and entitled "Surface Conditioning Grinding Machine." Briefly, the machine is adapted to grind or surface a billet 10 or other workpiece. The billet 10 is carried by a supporting structure 12 at a desired height above the floor of the establishment where the grinding machine is employed and operated. The generally flat upper surface of the billet is adapted to be conditioned or ground by a rotary power-driven grinding wheel 14 in order to remove from it scale and other imperfections. The wheel 14 is rotatably supported on the distal end of a boom 18 above the billet 10 and is adapted to be rotated by an electric motor M1 at any one of a number of desired speeds through the medium of a variable speed power transmission unit 26.

The boom 18 is pivotally supported on a boom carriage assembly 32 in such manner that the wheel 14 may be swung into or out of engagement with the billet 10. Swinging of the boom and the grinding wheel in a vertical plane is effected by way of a fluid motor in the form of an hydraulic boom cylinder 60 which has one end pivotally connected to the boom 18. A piston 63 (see FIGS. 3, 4 and 5) is slidably mounted in the cylinder 60 and is provided with a fixed piston rod which extends through the other end of the cylinder and has its outer end pivotally connected to a horizontal crosshead 64 on the boom assembly 32. The cylinder 60 is of the reaction type and is adapted, for boom-swinging purposes, to be moved in response to the supply of fluid under pressure to the piston 63. A fluid pump 66a (see FIG. 1A) is supported in any conventional manner on the grinding machine and serves to supply fluid under pressure to the cylinder 60 under control of an electric motor M3.

The boom carriage assembly 32 comprises a horizontally extending H-shaped casting 34. The crosshead 64 extends over and is suitably supported on the right-hand ends of the parallel side arms of the casting 34 as viewed in FIG. 1. The casting 34 is slidable on two horizontally extending, spaced apart guide tubes 36 which overlie and extend transversely across the billet 10 on the supporting structure 12. Said right-hand ends of the guide tubes 36 are fixedly connected to a tailstock carriage 40 and the left-hand ends of the guide tubes as viewed in FIG. 1 are fixedly connected to an operator's carriage 46. The boom carriage assembly 32 is adapted to be shifted bodily in either direction along the guide tubes 36 by a pair of hydraulic cylinders 70 under the side arms of the H-shaped casting 34 of the boom carriage assembly. The cylinders 70 are of the reaction type and are adapted to be moved in response to the application of fluid under pressure to respective pistons 168 therein. Fluid under pressure is supplied to the cylinders 70 from a fluid pump 66 under control of the aforementioned electrical motor M3. The pistons 168 in the cylinders 70 are fixedly connected to certain ends of horizontally extending reaction rods 172, the other ends of which project towards and are fixedly connected to the operator's carriage 46. The cylinders 70, when supplied with fluid under pressure by the pump 66, are thus adapted to move the boom carriage assembly 32 transversely across the billet 10.

A metering cylinder 96 (see FIG. 1A) for controlling the increment through which the cylinders 70 are moved is also carried by the boom carriage assembly 32. The metering cylinder 96 is associated with the pump 66 and has a piston 212 fixedly connected to one end of a horizontally extending piston rod 97 (see FIG. 1A). The piston rod 97 and the piston 212 are adapted, in response to the application of fluid under pressure to the piston 212, to move a distance corresponding to the setting of a stop screw 98 on a bracket 99.

The tailstock carriage 40 is movable on a horizontal rail 42 along the length of the billet 10 and adjacent to one side of the billet while the operator's carriage 46 is movable on a pair of rails 48 along the length of the billet 10 and adjacent to the other side of said billet. The carriage 46 and the tailstock carriage 40 are adapted to be driven by a fluid motor 50 which is mounted on the operator's carriage. Fluid under pressure is supplied to the fluid motor 50 from a fluid pump 52 under control of an electrical motor M2. The carriage 46 supports a cab 54 in which the operator of the grinding machine rides. Foot pedals 90 and 92 together with a series of push-button and lever-controlled switches on a control console 94 are provided for enabling the operator to control the movements of the carriage 46, the boom carriage assembly 32, the boom 18, and the grinding wheel 14.

It has previously been pointed out that grinding wheel drop-off at the end of a traversing operation on the billet 10 or other workpiece is an extremely hazardous contingency due to possible contact of the side of the wheel 14 with the end face of the billet and consequent shattering or fracture of the rotating wheel. One means for preventing such as drop-off has been schematically illustrated in FIGS. 3 and 4 wherein a pressure-operated electric switch SWE including a pair of normally closed contacts is responsive to the pressure of fluid in the upper region or carriage side of the boom cylinder 60 and operates when a pressure increase is encountered to deenergize a solenoid-actuated hydraulic directional valve DV4 having a control solenoid S1 and by means of which motive pressure fluid which normally is applied to the lower region or boom side of the cylinder to apply grinding pressure to the billet 10 by way of the grinding wheel 14 is conducted to the upper region of the cylinder to raise the grinding wheel above the level of the surface undergoing grinding, thus obviating or eliminating grinding wheel drop-off.

In FIG. 3, the grinding wheel 14 is shown by way of a dot-dash circular line as being in grinding contact with the upper surface of the billet 10 while grinding pressure is maintained by the existence of fluid under pressure in the lower region of the cylinder 60 and under the piston 63. The hydraulic circuit leading to the cylinder 60 extends from the pump 66 (which is driven by the motor M3 as shown in FIG. 1A) through a line 11, the directional valve DV4, and a flexible line 13 to the lower region of the cylinder 60, thus causing the cylinder 60 to be urged downwardly to maintain proper grinding pressure on the wheel. Fluid in the upper region of the cylinder 60 is bled to a sump 15 through a flexible line 17, a line 19, the valve DV4, and a line 21. The line 17 is connected through a line 23 to the pressure switch SWE and thus this switch maintains its contacts normally closed and establishes an electric circuit extending from the source S through a lead 25, the contacts of the switch SWE, a lead 27, the solenoid S1 of the valve DV4, and a lead 29 back to the source S. Energization of the circuit just described maintains the hydraulic circuit leading from the pump 66 to the lower region of the cylinder 60 effective, and grinding pressure is thus a function of the pressure of fluid maintained in lower region of the cylinder 60.

At such time as the grinding wheel is brought to the extreme edge of the billet 10 at the end of any given traverse operation, the normal tendency is for the grinding wheel 14 to be pushed downwardly under the influence of hydraulic pressure to the position illustrated by the dot-dash circular line in FIG. 4. However, with the safety circuit under consideration in effect, this condition of the grinding wheel never obtains inasmuch as the initial drop-off movement of the wheel (as shown by the full-line circle in FIG. 4) pulls the cylinder 60 downwardly and creates a high pressure in the upper region thereof, thus establishing a surge of pressure in the line 17 which, although connected to the sump 15, is nevertheless reflected through the line 23 to switch SWE and causes the same to open its contacts. The consequent deenergization of the solenoid S1 actuates the valve DV4 and reverses the flow of fluid under pressure therethrough so that motive pressure fluid is supplied to the upper region of the cylinder 60 above the piston 63, thus urging the cylinder 60 upwardly and causing the entire boom assembly 30 to be swung about the axis of the shaft 31 in a direction to raise the grinding wheel 14 above the level of the upper surface of the billet 10 so that it assumes the raised position indicated by way of a dotted circular line in FIG. 4. The hydraulic circuit leading to the upper region of the cylinder 60 extends from the pump 66 through the line 11, the valve DV4, and the lines 19 and 17. At this time, pressure fluid is bled from the lower region of the cylinder 60 through the flexible line 13, the valve DV4, the line 21 to the sump 15.

In the form of safety circuit illustrated in FIG. 5, grinding wheel drop-off is obviated by a modified and preferred control means, the operation of which is largely electric. In this form of safety circuit, the hydraulic circuitry, including the solenoid-actuated hydraulic reversing valve DV4, has been retained but the pressure switch SWE has been dispensed with, and instead of sensing the pressure of fluid under pressure in the upper region of the cylinder 60 for reversing switch change-over, the flow of current in the electric circuit for the motor M1 which drives the grinding wheel 14 is sensed by means of a current-responsive transformer T.

When the grinding wheel 14 is performing useful work and is in contact with the surface of the work undergoing conditioning or surfacing, the load upon the motor M1 is such that there is a heavy current drain in the electric circuit thereof. At such time as the grinding wheel overruns an edge of the work, this current drain is immediately relieved and normal idling current obtains in the circuit. Advantage has been taken of this phenomenon in designing the safety circuit of FIG. 5.

In FIG. 5, the grinding wheel 14 is shown by way of a full-line circle as being in operative grinding contact with the billet 10 (subject to closure of the contacts of a control button 49) so that the electric circuit for the motor M1 passes a relatively high current, this circuit extending from the source S and through a lead 51, the control button 49, a pair of leads 53 and 55, the motor M1, and a pair of leads 57 and 59 back to the source S. The high amperage in the circuit energizes a local circuit extending from the sensing transformer T, through a lead 61, a relay magnet RM1, and a lead 63 back to the transformer T. Energization of the magnet RM1 serves to close the contacts thereof and establish a circuit extending from the source S through the lead 51, the control button 49, the leads 53, a pair of leads 65 and 67, the contacts of the magnet RM1 (now closed), a lead 69, a relay magnet RM2, and three leads 71, 73 and 75 back to the source S. The relay magnet RM2 is provided with #1 and #2 contacts. Energization of the magnet RM2 opens the #1 contacts and closes the #2 contacts thereof, thus establishing a circuit extending from the source S through the lead 51, the control button 49, the leads 53 and 65, a pair of leads 79 and 81, a relay magnet RM3, a pair of leads 83 and 85, the #3 contacts of the relay magnet RM2 (now closed), a pair of leads 87 and 89, the leads 73 and 75 back to the source S. Energization of the relay magnet RM3 serves to close both of the normally open #1 and #2 contacts thereof. Closure of the #2 contacts of the relay magnet RM3 establishes a holding circuit for said relay magnet, this circuit extending from the lead 79 through the lead 81, the relay magnet RM3, the lead 83, a lead 91, the #2 contacts of the relay magnet RM3, a pair of leads 93 and 95, and the leads 89, 73, 75 back to the source S. The #1 contacts of the relay magnet RM3 are delayed contacts and their closure at this time is without effect inasmuch as the delay involved in closing them affords time for the #1 contacts of the magnet RM2 to become open. As long as the grinding wheel 14 remains on the billet 10, the #1 contacts of the relay magnet RM2 remain open and no energization of the relay magnet RM4 can be effected. Under such circumstances, the winding of the solenoid S1 of the directional valve DV4 remains deenergized and fluid is conducted to the lower region of the cylinder 60 to maintain grinding pressure as previously described.

At such time as the grinding wheel overruns an edge of the billet 10, the relief of frictional drag on the wheel restores the motor circuit to idling conditions and the consequent current drop-off in the circuit deenergizes the relay magnet RM1, thus opening the contacts thereof and deenergizing relay magnet RM2. Closure of the #1 contacts of this latter relay magnet then establishes a circuit from the lead 79 through a pair of leads 97 and 99, the relay magnet RM4, a pair of leads 101 and 103, the #1 contacts of the relay magnet RM3 (now closed), a lead 105, the #1 contacts of the magnet RM2, a lead 107 and the lead 75 back to the source S. Energizaiton of the relay magnet RM4 serves to close both the #1 and #2 contacts thereof. Closure of the #2 contacts of the relay magnet RM4 establishes a holding circuit for the relay magnet RM4 extending from the lead 97 through the lead 99, the magnet RM4, the leads 101 and 109, the #2 contacts of the magnet RM4, a pair of leads 111 and 113, the leads 95, 89, 73 and 75 back to the source S. Closure of the #1 contacts of the relay magnet RM4 establishes a circuit through the winding of the solenoid S1 of the reversing directional valve DV4, this circuit extending from the source S through the lead 51, the control button 49, the leads 53, 65, 79, 97 and 115, the solenoid S6 of the valve DV5, a lead 117, the #1 contacts of the magnet RM4 (now closed), a lead 119 and the leads 113, 95, 89, 73 and 75 back to the source S. Energization of the winding of the solenoid S1 of the valve DV4 effects reversal of the flow of fluid under pressure through the valve, thus causing pressure fluid to flow through an hydraulic circuit extending from the pump 66 through a line 121, the valve DV5, and a line 123 to the lower region of the cylinder 60 to effect raising of the grinding wheel 14 in the manner previously set forth in connection with the safety circuit of FIGS. 3 and 4. A bleed circuit extends from the upper region of the cylinder 60 through a line 125, the valve DV5, and a line 127 to the sump 15.

The safety circuits of the present invention are not to be limited to use in connection with the specific form of grinding machine that is illustrated and described herein, such illustration and description being purely exemplary of one form of grinding machine to which the present invention is applicable. The safety circuits, both electric and hydraulic, of FIGS. 3, 4 and 5 are applicable to any grinding machine which depends upon hydraulic pressure for maintaining the grinding wheel in contact with the surface of the work undergoing conditioning, providing, of course the grinding wheel is electrically driven. Therefore, only insofar as the invention has particularly been pointed out in the accompanying claim is the same to be limited.

Having thus described the invention what we claim as new and desire to secure by Letters Patent is:

In a machine for conditioning the surface of an elongated workpiece, in combination, a work support, an overhead carriage for a grinding wheel overlying the work support, means constraining said carriage to travel lengthwise of the work support to effect operative grinding wheel traverse over the surface of a workpiece on the support, a boom pivoted to said overhead carriage for limited swinging movements between a raised and a lowered position, a grinding wheel operatively mounted on the distal end of the boom, an electric motor on the overhead carriage operatively connected to the grinding wheel in driving relationship, an electric circuit for the motor, an hydraulic cylinder member, a piston member slidable in the cylinder member, means pivotally connecting one of said members to the overhead carriage and the other member to the boom, a reversible solenoid-actuated directional fluid valve for selectively supplying hydraulic fluid to the opposite ends of the cylinder member to effect relative movement between the members and including an actuating solenoid operable when energized to direct fluid to one end of the cylinder member to effect relative movement between the members in a direction to urge the boom downwardly with uniform pressure and operable when deenergized to direct fluid to the other end of the cylinder member to effect relative movement between the members in a direction to raise the boom, and relay circuitry effective when a predetermined maximum current flow is maintained in said motor circuit to maintain said solenoid energized and effective when the current in said motor circuit drops below said predetermined maximum to cause deenergization of said solenoid, said relay circuitry comprising a first relay magnet having a pair of normally open contacts, a second relay magnet having a pair of normally closed contacts and a pair of normally open contacts, a third and self-locking relay magnet having a pair of normally open slow-closing contacts, a fourth and self-locking relay magnet having a pair of normally closed contacts disposed in series with said solenoid, the normally open contacts of the first relay magnet being disposed in series with said second relay magnet, the normally closed contacts of the second relay magnet, the normally open slow-closing contacts of the third relay magnet and the fourth relay magnet being disposed in series relationship, and the normally open contacts of the second relay magnet being disposed in series with the third relay magnet.

References Cited

UNITED STATES PATENTS

| | | | |
|---|---|---|---|
| 2,694,274 | 11/1954 | McGibbon | 51—35 |
| 2,769,280 | 11/1956 | Comstock | 51—47 X |
| 2,906,066 | 9/1959 | Laverdisse | 51—165 |
| 3,052,067 | 9/1962 | Dilks | 51—35 |
| 3,089,287 | 5/1963 | Dilks | 51—35 |
| 3,149,439 | 9/1964 | Beattie | 51—34 |
| 3,156,072 | 11/1964 | Boehme | 51—35 X |

HAROLD D. WHITEHEAD, *Primary Examiner.*